United States Patent [19]

Jansen et al.

[11] 4,236,232
[45] Nov. 25, 1980

[54] OPTICAL READ APPARATUS FOR READING A DISC-SHAPED RECORD CARRIER

[75] Inventors: Gerardus L. M. Jansen; Leonardus G. H. Bovee, both of Eindhoven, Netherlands

[73] Assignee: U.S. Philips Corporation, New York, N.Y.

[21] Appl. No.: 8,134

[22] Filed: Jan. 31, 1979

[30] Foreign Application Priority Data

Oct. 17, 1978 [NL] Netherlands .......................... 7810386

[51] Int. Cl.³ .......................... G11C 13/08; G11B 7/00
[52] U.S. Cl. .............................. 365/234; 179/100.3 V
[58] Field of Search ................ 365/215, 234; 358/128; 179/100.3 V

[56] References Cited

U.S. PATENT DOCUMENTS

| | | | |
|---|---|---|---|
| 3,634,682 | 1/1972 | Gold | 250/201 |
| 3,962,688 | 6/1976 | Westerberg | 365/234 |
| 4,138,663 | 2/1979 | Lehureau | 365/234 |
| 4,142,098 | 2/1979 | Korpel | 358/128 |

*Primary Examiner*—Stuart N. Hecker
*Attorney, Agent, or Firm*—Thomas A. Briody; William J. Streeter; Simon L. Cohen

[57] ABSTRACT

An optical read apparatus for reading a disc-shaped record carrier. A read element is mounted on an adjusting member by means of which the read element is radially movable. Moreover, there is provided a deflection element for correcting the radial position of the scanning spot. In order to enable an arbitrary information unit on the record carrier to be read with a short searching time, the drive of both the adjusting member and the deflection element is controlled. In order to enable the adjusting member to be moved in a rapid and controlled manner there is provided a position indicator, which indicates the instantaneous radial position of the read element. Moreover, there is included a correction circuit which eliminates the adverse effect of inaccuracies in the position indicator on the searching time.

5 Claims, 3 Drawing Figures

OPTICAL READ APPARATUS FOR READING A DISC-SHAPED RECORD CARRIER

SUMMARY OF THE INVENTION

The invention relates to an optical read apparatus for reading a disc-shaped record carrier, on which information is recorded in accordance with a track configuration of substantially concentric tracks in the form of information units provided with an address. The apparatus comprises a read element for concentrating a read beam to a scanning spot on the information plane of the record carrier and detecting the information which is contained in the read beam after cooperation with said record carrier, an adjusting member carrying said read element for radially moving said read element, a drive arrangement for said adjusting member, a deflection device which cooperates with the radiation beam for radially shifting the scanning spot, a first control device for supplying a first control signal to the deflection device, a second control device for supplying a second control signal to the drive arrangement of the adjusting member, and a signal generator which cooperates with said first and second control devices for supplying a first reference signal which is indicative of the address of the desired information unit to be read so as to obtain a radial shift of the scanning spot to a position in which the desired information unit is read.

An apparatus of the aforementioned type is for example known from U.S. Pat. No. 4,106,058. Such an optical read apparatus in conjunction with the disc-shaped record carrier is eminently suitable for use in systems where it is desired to gain rapid access to arbitrary information units recorded on the record carrier. By radially moving the read element the entire information content of a disc-shaped record carrier is then accessible, while the searching time may be short and damaging of the record carrier is excluded because of the optical scanning.

Such a disc-shaped record carrier comprises one or more information units per track circumference of the information track. Said information track may comprise a plurality of purely concentric tracks or a spiral track. If an information unit covers a full track circumference each information unit may be read continually by repeatedly scanning the same track circumference of the information track. For a spiral information track the scanning spot should then be moved back over one track distance after each revolution of the record carrier.

Each information unit on the record carrier is provided with an address code, while with the aid of the signal generator a signal is generated which represents the address of the desired information unit to be read. By comparing said signal with the address of the information unit being read a control signal can be obtained which causes the necessary radial shift of the scanning spot. This radial shift is obtained by a controlled drive of both the drive arrangement of the adjusting member and the deflection device. The control of the drive arrangement of the adjusting member then serves as fast coarse control, by which the scanning spot is brought in the proximity of the track circumference containing the desired information unit, while the control of the deflection device functions as fine control, which positions the scanning spot exactly on the appropriate track circumference.

In such a system the searching time, i.e. time required to locate a specific desired information unit, is of very great significance. In the apparatus as is described in the said U.S. Patent this searching time is adversely affected by the method adopted in this apparatus for locating a desired information unit. In this known apparatus the address of the information unit being read is compared with the address of the desired information unit. If the difference between the two addresses is greater than a specific limit value, the drive arrangement of the adjusting member is energized, so that the read element is moved in a radial direction. During this radial movement of the scanning spot the number of tracks traversed by the scanning spot is counted, from which number the instant is derived at which the scanning spot has arrived at the desired track circumference and the radial movement may be stopped. However, for a sufficiently reliable detection of the number of tracks traversed by the scanning spot, the speed of the radial movement of this scanning spot must be limited.

It is an object of the invention to provide an apparatus of the type mentioned in the preamble, which allows a very fast searching time to be obtained by simple means. To this end the invention is characterized in that the signal generator supplies a second reference signal which is indicative of the radial position of the desired information unit to be read and that the apparatus is furthermore provided with a position indicator for supplying a position signal which is indicative of the radial position of the read element and that the second control device supplies a second control signal which is dependent on the difference between the second reference signal from the signal generator and the position signal from the position indicator.

The invention is based on the recognition that the record carriers used in such systems are generally standardized so that there exists a fairly accurate relationship between the addresses of the information units and the radial position of said information units on the record carrier. By having the signal generator supply a second reference signal which represents the radial position of the desired information unit, derived from the address of this information unit, it is possible to employ a signal which has been derived from said second reference signal from the signal generator and a radial position signal supplied by a position indicator which is coupled to the adjusting member as control signal for the drive arrangement of the adjusting member. As the reliability of a position signal supplied by such a position indicator is almost fully independent of the speed of the radial movement, this means that this speed may be increased substantially. Especially for larger radial shifts this yields a substantial reduction of the searching time.

As a result of possible deviations between the radial position of the scanning spot realized via the drive of the adjusting member and the actual radial position of the desired information unit, the residual correction of the radial position of the scanning spot to be performed by the deflection device will generally be slightly greater than in the known system, where the tracks on the record carrier itself function as reference for the control of the drive arrangement. Consequently, the gain in searching time which is achieved with the aid of the apparatus in accordance with the invention is greatest for large radial shifts and decreases at decreasing radial shifts.

In order to also minimize the searching time for smaller radial shifts a preferred embodiment of the apparatus in accordance with the invention is characterized in that the second control device is provided with a correction circuit, coupled to the first deflection device, for supplying a correction signal which during scanning of an information unit represents the average deflection of the deflection device, and for correcting the second control signal depending on this correction signal, and means for preserving the value of the correction signal when a radial shift of the scanning spot is realized by a movement of the adjusting member.

The signal supplied by the correction circuit is then a measure of the correction performed by the deflection device for locating a specific information unit. If during a subsequent radial shift this signal is used for correcting the control signal for the drive arrangement of the adjusting member, the correction which should then be performed by the deflection device is limited. This additional correction of the control signal for the drive arrangement of the adjusting member then has a double effect. On the one hand it reduces, as previously stated, the influence of a possible discrepancy between the second reference signal supplied by the signal generator and the actual radial position of the desired information unit on the searching time. On the other hand, it also reduces the influence of possible errors in the position indicator, such as non-linearities and offsets, on the searching speed.

For the position indicator there are various possibilities. As an example use can be made of an optical system comprising a radiation source and one or more photo cells, the radiation beam emitted to the photo cell(s) by the radiation source being masked to a greater or smaller extent by a vane which is connected to the adjusting member, depending on the position of said adjusting member. The output signal of the one photo cell or the difference signal of a plurality of photo cells is then a measure of the radial position of the read element. Another very simple version of the position indicator may comprise a potentiometer whose wiper is connected to the adjusting member. The design of the position indicator as such is not essential for the present invention, so that other versions may also be used within the scope of the present invention.

BRIEF DESCRIPTION OF THE DRAWINGS

The invention will now be described in more detail with reference to the Figures, of which FIG. 1 schematically represents an apparatus in accordance with the invention.

DETAILED DESCRIPTION OF THE PREFERRED EMBODIMENTS

Figure 1:
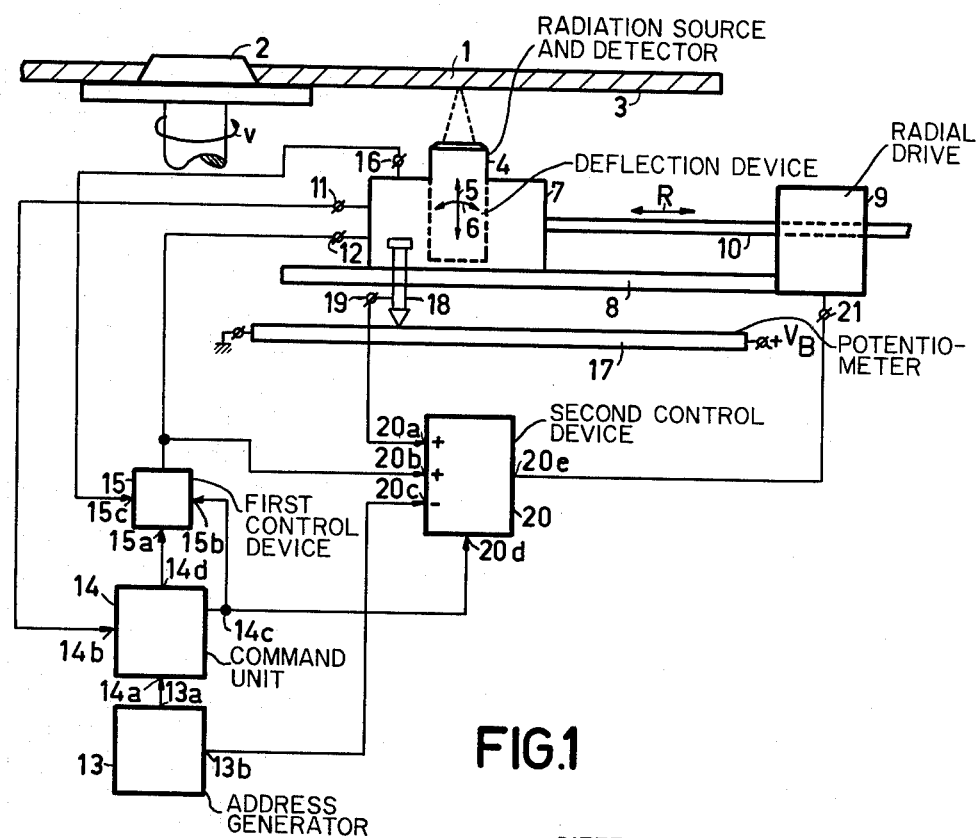

FIG. 1 schematically shows the apparatus in accordance with the invention. The disc-shaped record carrier is designated 1, which carrier is rotated by a spindle 2 in a direction V. In the present embodiment it is assumed that a record carrier is used having a reflecting information surface 3 on the underside of the disc, which is however not essential at all.

On this information surface 3 a scanning spot is focussed with the aid of a read element 4. For this purpose said read element 4 comprises, in known manner, a radiation source, a focussing system for focussing the emitted radiation beam to a scanning spot on the information surface 3, and a detector for detecting the information contained in the reflected radiation beam. The focussing system is controlled, as is schematically indicated by the double arrow 5, so as to ensure that regardless of vertical displacements of the information plane the scanning spot remains focussed correctly. Moreover, the read unit 4 is pivotable, schematically represented by the double arrow 6, so that the radial position of the scanning spot on the information plane can be changed. Thus, this arrow 6 represents the previously mentioned deflection device for controlling the radial position of the scanning spot. This radial scanning position of the scanning spot is controlled both to ensure that this scanning spot remains coincident with an information track regardless of any eccentricities of the information track and to ensure that the scanning spot coincides with the information track containing the desired information unit to be read.

Both in respect of the automatic focussing of the scanning spot and in respect of the control of the radial position of said scanning spot a multitude of systems are known. As the manners in which the control signals required for these control systems are obtained and the manners in which the actual control by means of said control signals are realized are of subordinate importance for the present invention reference is made, by way of example, to U.S. Pat. Nos. 3,833,769; 4,010,317; 3,876,875; 3,876,841; 3,873,763; 3,992,574; 3,992,575; 3,969,575; 4,150,399 and to U.S. Patent application Ser. No. 442,396, filed Feb 14, 1974.

The construction of the read element 4 which is shown schematically in FIG. 1 essentially corresponds to the element as revealed in U.S. Pat. No. 4,135,083, which is incorporated herein by reference. However, the invention is by no means limited to the use of such an element. Different arrangements of the optical elements and control means, inter alia as described in the aforementioned Patent and applications and the U.S. Pat. No. 3,854,015, may equally be used.

The read element 4 is mounted on an adjusting member 7, which is movable along a guide 8 in the direction R. The adjusting member 7 is then moved by a drive arrangement 9, which cooperates with a spindle 10 which is secured to the adjusting member 7. For this purpose this drive arrangement 9 may have a construction as described in U.S. Pat. No. 4,135,083, i.e. be provided with an electric motor and two conical gear wheels, one of which is internally provided with a nut which cooperates with the spindle 10 which takes the form of a lead screw. An alternative drive arrangement may comprise a so-called linear motor, the stator being incorporated in the carriage 8 and the rotor in the adjusting member 7. Instead of said rectilinear movement the read element 4 may also perform a movement in accordance with an arc of circle, the adjusting member then comprising an arm which is pivotable about a spindle, which arm in its turn may be driven in various manners.

The adjusting member 7 is provided with a signal terminal 11, which is connected to the optical detector incorporated in the read element 4 and on which the information read from the record carrier 1 is consequently available. This signal terminal 11 will be connected to a signal processing unit (not shown). The adjusting member 7 is furthermore provided with a control terminal 12, which is connected to the deflection device, i.e. in the present example to the control device which determines the angular position of the read element 4 in the direction 6 and thus the radial scanning position on the record carrier 1.

As stated in the introduction to this description the apparatus in accordance with the invention is intended for use in systems in which rapid access is to be gained to an arbitrarily selected information unit on the record carrier. For this purpose each information unit on the record carrier is provided with its own address, said address corresponding to a track number if information units which correspond to one track circumference are used. The address of a desired information unit is inserted with the aid of a signal generator 13, having an output 13a on which said desired address is available in coded form. This output 13a of the signal generator 13 is connected to an input 14a of a command unit 14. The second input 14b of this command unit 14 is connected to the signal terminal 11. As this signal terminal 11 supplies a signal which represents the information unit being read instantaneously, the address of the information unit being read is also available on this terminal. In the command unit 14 the address of the information unit being read is compared with the address of the desired information unit and from the difference between the two the required radial shift of the scanning spot is derived, while said command unit 14 moreover, determines how said radial shift is to be realized.

If the difference between the instantaneous and the desired address is so small that the corresponding radial shift of the scanning spot lies within the range of the deflection device 6 incorporated in the read element 4, a first control device 15 is energized. This control device 15 comprises a command input 15b, which is connected to an output 14c of the command device 14, on which the command signal for actuation or non-actuation of the control device 15 is available. Furthermore, said control device 15 has an input 15a which receives a signal corresponding to the difference between the instantaneous and the desired address from an output 14d of the command device 14. The control device 15 converts this signal into a control signal which is suitable for the drive arrangement used, which is applied to the control terminal 12 and which causes the desired radial shift of the scanning spot.

The radial shift of the scanning spot caused by the drive of the deflection device can be measured by counting the number of tracks traversed by said scanning spot. As an alternative it is possible to first perform a shift which is dictated by the command device 14, to determine the address of the information unit then being read and, if necessary, to perform a further shift on the basis thereof.

The control device 15 furthermore comprises a third input 15c, which is connected to a terminal 16 of the adjusting member 7. On this terminal 16 the control signal is available which is a measure of the radial positional deviation of the scanning spot relative to the nearest track. Via the control device 15 this control signal controls the deflection element 6 in such a way that the scanning spot keeps cooperating with a track circumference once selected. During the rapid travel of the scanning spot over a number of tracks the control signal in the input 15a of the control device 15 is therefore decisive for the drive of a deflection device, while at the instant that the correct track circumference is scanned the control signal on the input 15c is decisive for the drive of the deflection element and ensures that regardless of any eccentricities of said information track the scanning spot remains coincident with said desired information track.

If the difference between the address of the desired information unit and the address of the information unit being read instantaneously is so large that the corresponding correction of the radial position of the scanning spot falls outside the range of the deflection device, the adjusting member 7 should be moved first. In order to enable this to be realized in a rapid manner the apparatus in accordance with the invention is provided with a position indicator, which in the present embodiment comprises a potentiometer 17, whose wiper 18 is connected to the adjusting member 7 and which receives two fixed voltage (0 and $+V_B$) on its output terminals. This means that on the signal terminal 19 which is connected to the wiper 18 a voltage is available which is a measure of the radial position of the adjusting member 7 and thus of the scanning spot.

On its output 13b the signal generator 13 produces a reference signal, which is a representative of the radial position of the desired information unit. For this it is assumed that in systems employing the apparatus in accordance with the present invention standard record carriers are used and that moreover the consecutive addresses of the information units are unambiguous. Thus, it is comparatively simple to transform the address dictated by the signal generator 13 into an analog signal value which corresponds to the radial position of the desired information unit on the record carrier. The signal value produced by the signal generator 13 on the output 13b is applied to an input 20c of a control device 20, which on an input 20a receives the position signal obtained from the wiper 18 of the potentiometer 17. The difference of these two signals then determines the control signal on the output 20e of the control device 20, which is connected to the control terminal 21 of the drive arrangement 9.

In the present embodiment the control device 20 is continuously actuated. Therefore, if a small radial shift of the scanning spot is necessary both the coarse control (control device 20) and the fine control (control device 15) will be active. However, as the response time of the fine control via the deflection element is shorter than that of the coarse control, the radial shift will initially be realized by the fine control, before a perceptible movement of the adjusting member by the coarse control is performed. The effect of this movement of the adjusting member on the radial position of the scanning spot is then obviously compensated for by the fine control. If a comparatively large radial travel of the scanning spot is desired the control device 15 is rendered inactive, so that then initially only the coarse control is operative. After the radial travel has been performed by the coarse control, the fine control is switched on by actuating the control circuit 15, after which a residual difference between the address of the information unit being read and that of the desired information unit is eliminated by the deflection device 6.

As the measurement of the radial position of the adjusting member, and thus of the scanning spot, when a position indicator is used, in the present embodiment potentiometer 17, is unambiguous, independently of the speed with which the adjusting member 7 is moved, said position indicator does not impose any limitation at all on the maximum permissible speed of movement of said adjusting member 7. Thus, the maximum speed of movement attainable is fully determined by the loop gain and the bandwidth of the control loop for said radial coarse control.

As the position indicator supplies a signal which is not directly related to the radial position of the desired information unit to be read on the record carrier, the radial position assumed by the scanning spot after coarse control via the drive of the adjusting member may still exhibit a certain deviation from the desired radial position. This deviation is then eliminated via the deflection element by the fine control which is activated after the coarse control.

Figure 3:
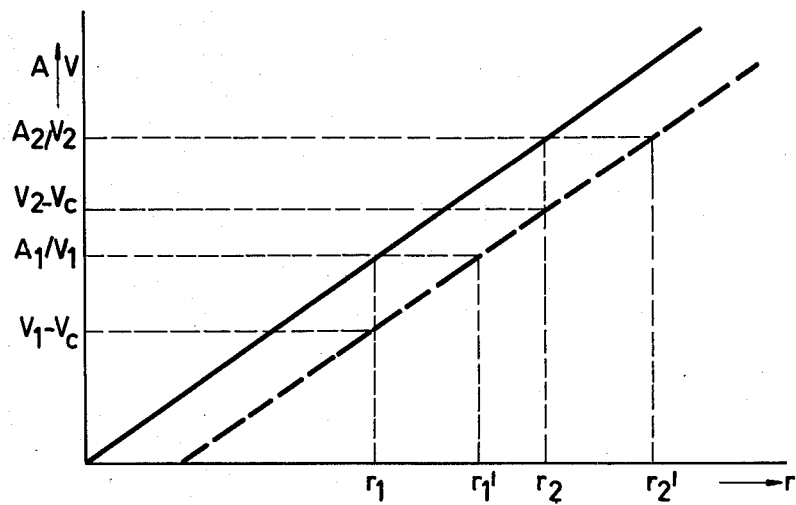
FIG. 3 shows a diagram in explanation of the operation of said control device.

If there is a discrepancy between the position signal supplied by the position indicator and the second reference signal supplied by the signal generator 13 on the output 13b, for example because the radial location of the information tracks on the record carrier exhibits a radial positional deviation or because the position signal on the terminal 19 as a function of the position of the wiper 18 has an incorrect slope owing to the voltage $V_B$ at the end of the potentiometer having an incorrect value, the searching time increases especially for comparatively small radial shifts. This is illustrated in FIG. 3.

In this Figure the uninterrupted line represents the relationship between the addresses A and the corresponding radial position r on the record carrier. An address $A_1$ consequently corresponds to a radial position $r_1$ of the scanning spot and an address $A_2$ to a radial position $r_2$. In the ideal case the variation of the voltage V available on terminal 19 of the potentiometer 17 as a function of the radial position should coincide with the uninterrupted line. It is assumed that this is not the case, but that the variation of the voltage V as a function of r corresponds to the dashed line, which represents a situation in which the track configuration on the record carrier occupies an incorrect radial position.

If in this situation the signal generator 13 now supplies a reference signal $V_1$ corresponding to the desired address $A_1$ to the control circuit 20, the radial position $r_1'$, instead of the desired radial position $r_1$, is occupied as a result of the movement of the adjusting member 7 via the coarse control. After termination of the coarse control the radial distance $r_1'-r_1$ should then be covered by driving the deflection device so as to move the scanning spot to the correct radial scanning position $r_1$ and to read the desired information unit. If subsequently a different information unit having an address $A_2$ is to be read, the coarse control is first rendered operative. This control receives a voltage $V_2$ corresponding to the address $A_2$ as reference signal, so that via this coarse control the radial position $r_2'$ is assumed. During the time that this coarse control is active, the deflection device 6 has returned to its rest position, which is desirable in order to ensure that this deflection device is positioned in the centre of its range upon termination of the coarse control. This may be achieved by actively controlling said deflection device 6 to its rest position during the time that the coarse control is operative or by turning off the drive to this deflection device and following the deflection device to swing to its rest position via its normally obtaining spring constant. Upon termination of the coarse control, the radial position $r_2'$ being occupied, the deflection device 6 should cover the distance $r_2'-r_2$ in order to reach the desired radial position $r_2$. However, this means that for each radial travel for which the coarse control is operative, the deviation from the radial position obtained by means of the coarse control, which deviation is caused by the coarse control as a result of the discrepancy between the potentiometer and the radial position of the information tracks on the record carrier, should be eliminated via the deflection device. Especially for smaller radial travels this has an adverse effect on the searching speed.

In order to mitigate this drawback the control circuit 20 preferably performs a correction of the control signal on the output 20e depending on the average deflection of the deflection element 6 during reading of a desired information unit. This average deflection of the deflection element is a measure of the correction to the coarse control necessarily performed by the fine control during searching of the relevant information unit, in other words for the incorrect setting of this coarse control. By storing in the control device 20 a signal which represents the average deflection of the deflection device, this signal may function as correction signal for the coarse control signal when searching for a subsequent information unit to be located, so that the erroneous setting of the coarse control is corrected to a considerable extent, as will be demonstrated hereinafter.

In the present example the control circuit for this purpose comprises an additional input 20b, which is connected to the output of the control circuit 15. It is now assumed that the deflection device 6 is of a type in which is moved against spring force via the control signal. In that case the control signal itself is a measure of the deflection of the deflection element. In the case of a different type of deflection element, where this is not the case, it is of course possible to obtain a signal which is repesentative of the deflection with the aid of a transducer mounted on the deflection element, in which case the input 20b of the control circuit 20 should be connected to said transducer.

Figure 2:
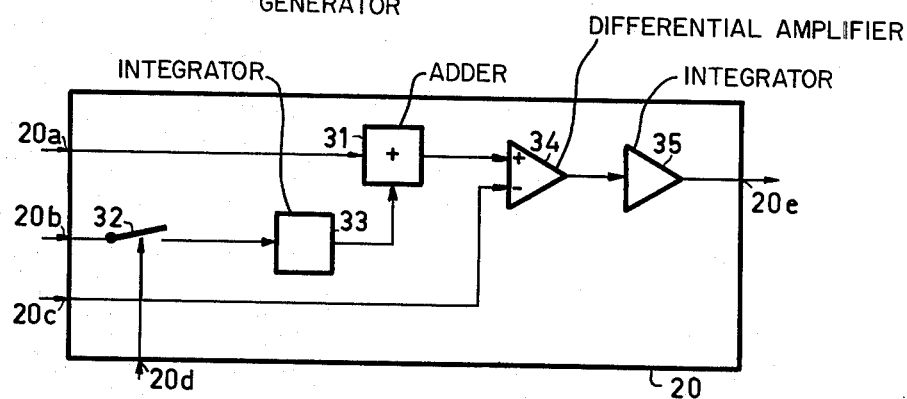
FIG. 2 shows a preferred version of the second control device.

The control device 20 furthermore comprises a control input 20d, which is connected to the output 14c of the command device 14 and by means of which the control signal is corrected at the appropriate instants. In order to explain how this correction is realized reference is made to FIG. 2 which shows a preferred version of the control device 20.

This control device 20 comprises an integrator 33. The input of this integrator is connected to the input 20b of the control device 20 via a switch 32, while its output is connected to an adder circuit 31, which is also connected to the input 20a of the control device 20. Furthermore the control device 20 comprises a differential amplifier 34 having two inputs which are respectively connected to the adder circuit 31 and the input 20c. Via a servo amplifier 35 the output of said differential amplifier 34 is coupled to the input 20e of the control device 20. Finally, the switch 32 is actuated by the command signal on the control input 20d.

In order to explain the operation of the control device of FIG. 2 reference is again made to FIG. 3. It is assumed that the voltage on the output of the integrator 33 is zero and that the reference signal on the input 20c is $V_1$. Thus, the radial position $r_1'$ is occupied via the coarse control. In order to reach the desired radial position $r_1$ the deflection device 6 should again cover the distance $r_1'-r_1$, for which purpose the control device 15 of FIG. 1 supplies a corresponding control signal to said deflection device. Via the switch 32, which is closed after the coarse control has been performed, this control signal is applied to the integrator 33, which integrates said control signal. In the adder circuit 31 the integrated signal is added to the position signal obtained from the position indicator. Thus a difference signal is obtained at the input of the differential amplifier 34, as a result of which the adjusting member is moved in the direction of the radial position $r_1$ via the drive arrangement 9. This movement continues until the signal on the input 20b has an average value of zero, i.e. until the deflection unit has reached its zero position. It will be evident that in this situation the position signal supplied by the potentiometer 17 is $V_1 - V_c$, corresponding to the radial position $r_1$, $V_c$ being the output voltage of the integrator.

If the scanning spot should now be moved from position $r_1$ to position $r_2$, switch 32 is opened simultaneously with the actuation of the coarse control, so that the instantaneously available output voltage $V_c$ of the integrator 33 is preserved. The reference signal $V_2$ corresponding to the address $A_2$ of the desired information unit is applied to the input 20c. Via the coarse control unit the adjusting member 7 is moved until the output signal of the adder circuit 31 is equal to said reference signal $V_2$. Since the integrator 35 has an output voltage $V_c$, this will be the case for a value of the position signal on the input 20a equal to $V_2 - V_c$, which corresponds to the desired radial position $r_2$ of the scanning spot. This means that a result of this correction with the aid of the integrator 33 the coarse control has substantially moved the scanning spot to the correct radial position, so that the correction to be performed subsequently by the fine control is minimal.

If the desired and the actual characteristics shown in FIG. 3 are parallel, the adverse effect of the discrepancy between these two characteristics on the searching speed is thus fully eliminated by the said correction of the control signal from the coarse control. If the two characteristics have a mutually different slope or if the characteristic of the position indicator is non-linear, this is obviously no longer entirely correct. However, as in practice the said deviations from the desired characteristics are at any rate very gradual, the desired and the actual characteristic may be assumed to extend substantially parallel for small radial movements. This means that for these comparatively small radial movements, for which the adverse effect of the incorrect setting of coarse control on the searching time would be strongest, the correction is very effective.

It will be evident that the invention is by no means limited to the use of the elements indicated by way of example. As position indicator any element may be used which supplies a signal which is a measure of the position of the adjusting member. A known example are optical indicators, in which a vane secured to the adjusting member masks the light beam to a greater or smaller extent depending on the position of the adjusting member.

The design of the correction circuit obviously depends inter alia on the type of deflection element, the shape of the control signal from the control device 15 and the like. Instead of an integrator 33 it is for example also possible to use an integrator in the form of a counter, whose count is determined by the deflection of the deflection device. Essentially, any circuit may be used which supplies an output signal which approximately corresponds to the average value of an input signal.

What is claimed is:

1. An improved optical read apparatus for reading a disc-shaped record carrier, on which information is recorded in accordance with a track configuration of substantially concentric tracks in the form of information units provided with an address, which apparatus comprises a read element for concentrating a read beam to a scanning spot on the information plane of the record carrier and detecting the information which is contained in the read beam after cooperation with said record carrier, an adjusting member carrying said read element for radially moving said read element, a drive arrangement for said adjusting member, a deflection device which cooperates with the radiation beam for radially shifting the scanning spot, a first control device for supplying a first control signal to the deflection device, a second control device for supplying a second control signal to the drive arrangement of the adjusting member, and a signal generator which cooperates with said first and second control devices for supplying a first reference signal which is indicative of the address of the desired information unit to be read so as to obtain a radial shift of the scanning spot to a position in which the desired information unit is read, the improvement being characterized in that the signal generator supplies a second reference signal which is indicative of the radial position of the desired information unit to be read, and that the apparatus is furthermore provided with a position indicator for supplying a position signal which is indicative of the radial position of the read element, and that the second control device supplies a second control signal which is dependent on the difference between the second reference signal from the signal generator and the position signal from the position indicator.

2. An apparatus as claimed in claim 1, characterized in that the second device is provided with a correction circuit coupled to the first deflection device, for supplying a correction signal which during scanning of an information unit represents the average deflection of the deflection device, and for correcting the second control signal depending on this correction signal, and means for preserving the value of the correction signal when a radial shift of the scanning spot is realized by a movement of the adjusting member.

3. An apparatus as claimed in claim 2, characterized in that the correction circuit comprises an adder circuit for adding said correction signal to the second control signal.

4. An apparatus as claimed in claim 2 or 3, characterized in that the position indicator is constituted by a potentiometer.

5. Apparatus for reading a disc-shaped record carrier on which information units and addresses have been recorded in the form of a plurality of optically readable indicia along a plurality of substantially concentric tracks, comprising read element means for projecting a radiation beam toward the tracks of the record carrier and for converting the radiation from the carrier into electrical signals corresponding to said information units and addresses, signal responsive adjusting member means for moving said read element radially with respect to said record carrier, signal responsive deflection device means for radially shifting said radiation beam, generator means for providing a first signal corresponding to a desired address to which the radiation beam is to be moved and for providing a second signal corresponding to a desired radial position to which the read element is to be moved, position indicator means for providing a signal corresponding to the radial position of said read element, command unit means for comparing the first signal from the generator means with the address signal from the read element means and for providing a command signal corresponding to the difference between these two signals; first control signal generating means responsive to command signals below a predetermined value for providing a signal to said deflection device thereby to cause said deflection device to shift the radiation beam toward the desired address, and second control signal generating means for comparing the second signal from the generator means with the signal from the position indicating means and for providing a control signal corresponding to the difference between these two signals to the adjusting member means thereby to move the read element to the desired radial position.

* * * * *